United States Patent [19]

Raum et al.

[11] 3,736,606

[45] June 5, 1973

[54] TWISTED PAIR UNTWISTING AND STRIPPING TOOL

[75] Inventors: John F. Raum, Winston-Salem; Henry R. Tillman, Forsyth, both of N.C.

[73] Assignee: Western Electric Company, Incorporated, New York, N.Y.

[22] Filed: June 1, 1971

[21] Appl. No.: 148,682

[52] U.S. Cl. ..............................7/14.1 R, 81/9.5 R
[51] Int. Cl. ..............................................H02g 1/12
[58] Field of Search......................7/14.1 R; 140/123; 81/9.5 R, 9.5 A, 9.51; 30/90.1

[56] References Cited

UNITED STATES PATENTS 3,103,837   9/1963   Allen et al. ..........................81/9.5 R

OTHER PUBLICATIONS

Curley, Insulation Stripper For Twisted Wires, IBM Technical Disclosure Bulletin, Vol. 3, No. 5 10-1960.

*Primary Examiner*—Granville Y. Custer, Jr.
*Assistant Examiner*—Roscoe V. Parker
*Attorney*—W. M. Kain, J. B. Hoofnagle and W. L. Williamson

[57] ABSTRACT

A tool has a pair of untwisting projections and a spring biased slide with an insulation stripping blade. The projections have rounded edges forming a slot for untwisting a twisted pair of wires when the wires are pulled therethrough. The bias of the slide positions the stripping blade adjacent to the untwisting projections with the untwisting projections aligned with the stripping blade in position to receive the ends of the twisted pair of wires. During first movement of the wires relative to the tool, the ends of the wires are untwisted while the stripping blade and slide moves with the wires. When the slide engages a stop, continued movement of the wires strips the insulation from the ends of the wires.

4 Claims, 4 Drawing Figures

INVENTORS
J. F. RAUM
H. R. TILLMAN
BY D. W. Marks
ATTORNEY

3,736,606

TWISTED PAIR UNTWISTING AND STRIPPING TOOL

BACKGROUND OF THE INVENTION

1. Field of the Invention

In electronic equipment twisted pairs of wires are often used to connect selected terminals of the equipment. In making electrical connections, such as wrapped wire connections, it is necessary that the ends of the twisted pairs of wires be untwisted and the insulation stripped therefrom.

2. Description of the Prior Art

In the prior art the untwisting and stripping of the ends of a tightly twisted pair of wires requires two operations. In a first operation, an operator pulls the ends of the twisted pair of wires between the closed ends of an ordinary spring clothes pin to untwist the ends. In the second operation, the operator uses a conventional insulation stripping tool to strip the insulation from the untwisted ends of the pair of wires.

SUMMARY OF THE INVENTION

An object of the invention is a new and improved tool for untwisting and stripping the ends of a pair of twisted wires.

Another object of the invention is a tool which allows an operator to untwist and strip the insulation from the ends of a pair of twisted wires in a single operation.

In accordance with these and other objects, a tool embodying the principles of the invention includes a body with facilities for first untwisting the ends of a pair of twisted wires and then for stripping the insulation from the ends of the pair of wires. The untwisting may be accomplished by a pair of projections with rounded edges for untwisting the wires as they are pulled between the edges. The stripping may be performed by an insulation stripping blade mounted on a slide member movable along with the wires relative to the body from a first position to a second position whereupon the insulation is stripped.

DETAILED DESCRIPTION

Figure 1:
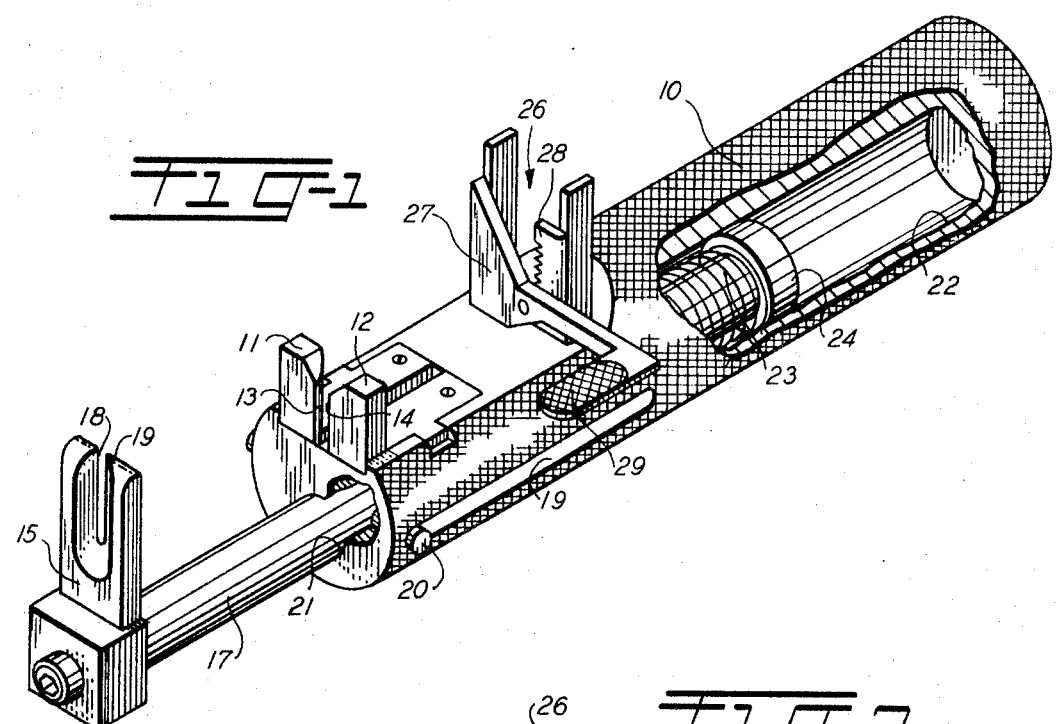
FIG. 1 is an isometric view of an embodiment of the invention.

Referring first to FIG. 1, there is shown a tool for untwisting and stripping the ends of a pair of twisted wires. The tool has a body or handle portion 10 which is suitably shaped and/or knurled to be grasped and handled by an operator. The tool has a pair of projections 11 and 12 mounted on one end of the body 10. The members 11 and 12 have respective rounded edges 13 and 14 which face each other and are spaced apart to form a slot such that the ends of a pair of twisted wires are untwisted when pulled therebetween. The projections 11 and 12 may be adjustably mounted on the body 10 such that the width of the slot between edges 13 and 14 may be adjusted to accomodate different diameter wires. The width of the slot must be greater than approximately the diameter of either of the pair of wires and must be less than the sum of the diameters of both of the pair of wires. The projections 11 and 12 could also be biased together by springs or air pressure so that the opening therebetween would be approximately the diameter of one of the pair of wires.

An insulation stripping blade 15 is suitably mounted on an end of a shaft 17. The stripping blade 15 is forked with facing knife edges 18 and 19 separated by a distance substantially less than the width of the outer diameter of the insulation, but slightly greater than the width of the metal conductor. The insulation stripping blade 15 severs sufficient insulation that movement of the blade relative to ends of the wires readily pulls the insulation off the ends.

The shaft 17 slidably extends through a bore 21 into a cavity 22 of the body 10. A spring 23 interposed between a head 24 of the shaft 17 and a wall of the cavity 22 normally biases the shaft 17 to place the blade 15 against the projections 11 and 12. The spring 23 has sufficient compressive force to readily move the shaft 17 and blade 15 to a closed position (FIG. 2) but insufficient to pull the insulation off of the ends of the twisted pair of wires. A pin 20 mounted in the side of the shaft 17 extends into a slot 19 of the body 10 for maintaining the insulation severing blade in alignment with the projections 11 and 12. Additionally the pin 20 limits the forward movement of the shaft 17 and insulation severing blade 15.

A wire cutter 26 is mounted on the body 10 in a conventional manner, i.e. screws etc. The wire cutter 26 has a pair of scissor-like blades 27 and 28 which are closed by a thumb lever 29 to sever the ends of the pair of wires to a predetermined length. Conveniently, the cutter 26 may be adjusted relative to the end of the body 10 to provide for changing the length of wire which is stripped on the ends of the pair of wires.

Figure 2:
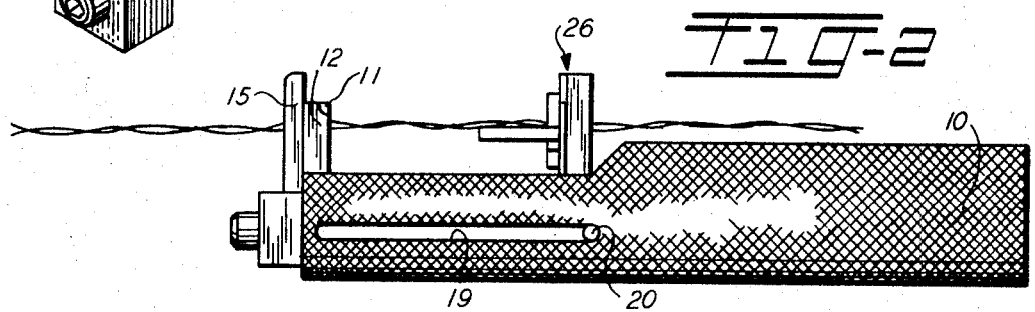
FIGS. 2 and 3 show two positions of a sliding member of the tool shown in FIG. 1.
Figure 3:
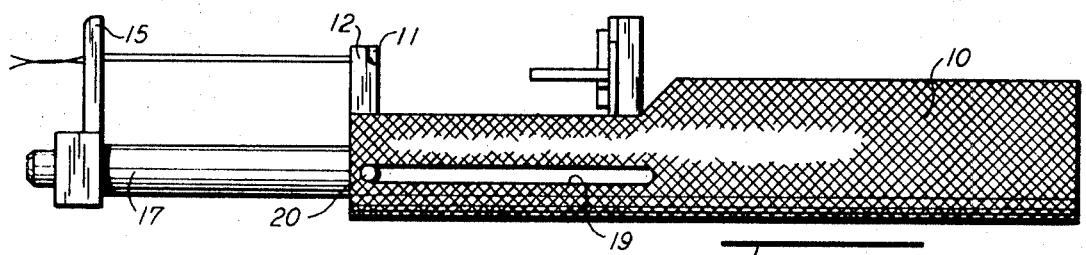
Figure 4:
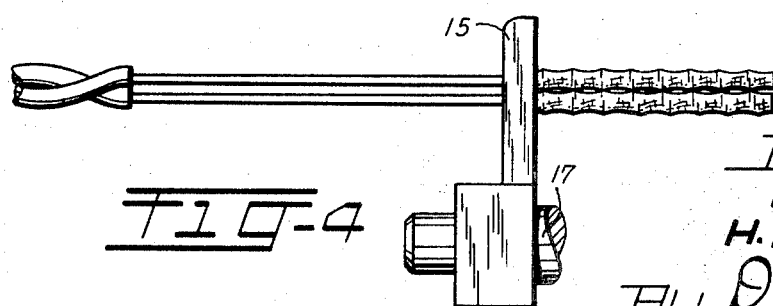
FIG. 4 illustrates the stripping of insulation from the ends of a pair of wires by stripping blades of the apparatus shown in FIGS. 1–3.

Referring to FIG. 2, in operation a pair of twisted wires are placed by an operator between the edges 18 and 19 of the blade 15 and in the slot between the projections 11 and 12. The operator then operates the cutter 26 to sever the ends of the pair of wires to a predetermined length. Next the operator pulls the pair of wires away from the body 10, as shown in FIG. 3. The pair of wires are untwisted as they are pulled through the slot formed between the projections 11 and 12. The blade 15 and the shaft 17 move with the pair of wires until the pin 20 engages the left extremity of the slot 19, as shown in FIG. 3. Thereafter continued movement of the pair of wires away from the body 10 strips the insulation from the ends of the pair of wires as shown in FIG. 4.

The above-described embodiments of the invention are simply illustrative of the principles of the invention and many embodiments may be devised without departing from the scope and spirit of the invention. For example, the described tool is adapted to be held by an operator, but the principles of the invention could readily be incorporated in a tool wherein the body is mounted on a bench or stand.

What is claimed is:

1. A tool for untwisting and stripping the insulation from the ends of a pair of twisted wires comprising:
 a body;
 a pair of projections extending from the body, the projections forming a slot therebetween with rounded edges, the slot having a width greater than the diameter of either of the pair of wires but less than the sum of the diameters of both the wires such that the pair of twisted wires are untwisted when pulled through the slot;

a member slidably mounted relative to the body for moving in first and second opposite directions relative to said body;

stop means for limiting movement of the sliding member in the first direction;

an insulation stripping blade mounted on the sliding member in alignment with the projections; and means for biasing the sliding member in the second direction to urge the insulation stripping blade adjacent the projections in position to receive the pair of twisted wires with the ends extending in the second direction, the biasing means allowing the insulation stripping blade and sliding member to move in the first direction when the pair of twisted wires are moved in the first direction to untwist the pair, to operate the stop means and to strip the insulation from the ends of the pair.

2. A tool as defined in claim 1 which includes a wire cutter mounted on the body for cutting the ends of the pair of twisted wires to a predetermined length extending through the projections and insulation stripping blade.

3. A tool for untwisting and stripping the insulation from the ends of a pair of twisted wires comprising:

a body;

a pair of projections extending from the body, the projections forming a slot therebetween with rounded edges, the slot having a width greater than the diameter of either of the pair of wires but less than the sum of the diameters of both the wires such that the pair of twisted wires are untwisted when pulled through the slot;

a shaft slidably mounted in the body;

stop means on the body and shaft for preventing movement of the shaft in a first direction past a first position relative to the member;

an insulation stripping blade mounted on the shaft in alignment with the projections for partially severing and gripping the insulation to be stripped; and a spring for biasing the shaft in a second direction which is opposite the first direction to urge the insulation stripping blade against the projections in position to receive the pair of twisted wires with the ends extending in the second direction, the spring allowing the shaft to move in the first direction when the pair of twisted wires are moved in the first direction relative to the body to untwist the pair, to operate the stop means and to strip the insulation from the end of the pair.

4. A tool as defined in claim 3, wherein the stop means includes:

a slot with a closed end; and a pin mounted on the shaft extending into the slot with the closed end of the slot preventing movement of the shaft in the first direction past the first position.

* * * * *